No. 882,350.
PATENTED MAR. 17, 1908.
B. F. SHAUGHNESSY.
SEAL FOR PIPE JOINTS.
APPLICATION FILED MAR. 21, 1907.
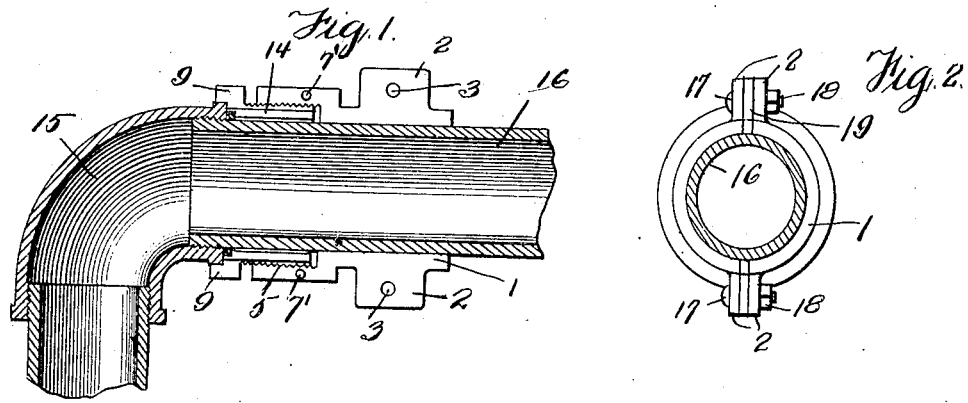
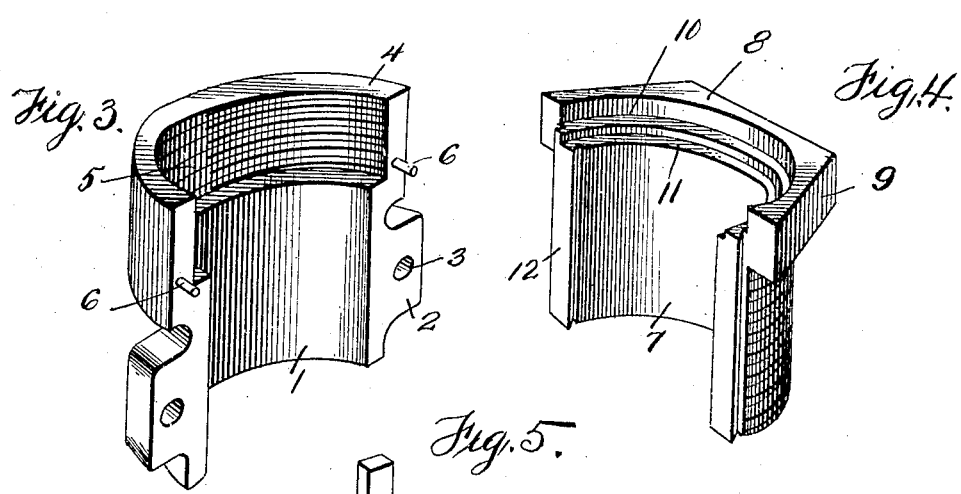
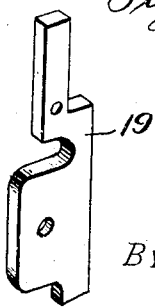
WITNESSES:
Samuel Payne
A. H. Butler
INVENTOR
B. F. Shaughnessy
By H. C. Evert & Co.
Attorneys

UNITED STATES PATENT OFFICE.

BERNARD FRANCES SHAUGHNESSY, OF PITTSBURG, PENNSYLVANIA.

SEAL FOR PIPE-JOINTS.

No. 882,350.

Specification of Letters Patent.

Patented March 17, 1908.

Application filed March 21, 1907. Serial No. 363,753.

*To all whom it may concern:*

Be it known That I, BERNARD FRANCES SHAUGHNESSY, a citizen of the United States of America, residing at Pittsburg, in the county of Allegheny and State of Pennsylvania, have invented certain new and useful Improvements in Seals for Pipe-Joints, of which the following is a specification, reference being had therein to the accompanying drawing.

This invention relates to a seal for pipe joints, and the invention has for its object to provide positive and reliable means for stopping a leak in a pipe joint.

The invention comprises a novel two-part clamp and a two-part sleeve which can be easily and quickly placed upon a pipe to stop a leak of the pipe joint.

The detail construction entering into my invention will be more fully described in detail and then specifically claimed.

Referring to the drawing forming part of this specification, like numerals of reference designate corresponding parts throughout the several views, in which:

Figure 1 is a sectional view of a pipe joint illustrating my improved seal applied thereto, Fig. 2 is an end view of the same with the pipe in section, Fig. 3 is a perspective view of a section of one of the clamping members, Fig. 4 is a similar view of a section of one of the sleeves comprising part of my improved seal, Fig. 5 is a perspective view of a washer interposed between the sections of the sleeves and clamps.

To put my invention into practice, I construct a clamp consisting of two semi-cylindrical sections 1, said sections being provided with diametrically opposed flanges 2 having openings 3 formed therein. One end of each section is enlarged to form a semi-cylindrical collar 4, which is interiorly screw threaded, as at 5. One section is provided with dowel pins 6, while the opposite section is provided with openings 7' to receive said pins. These pins and openings therefore operate to retain the screw-thread of the sections in proper alinement for the reception of the screw-threads of the sectional sleeve.

In connection with the clamp, I employ a sleeve consisting of two semi-cylindrical sections 7, each section having its one end enlarged, as at 8, and provided with exterior flat faces 9. The enlarged end of each section is provided with stepped shoulders 10 and 11, the latter forming a pocket for packing. The edges of one section are provided with dove tail tongues 12, while its adjoining section is provided with dove tail grooves 14, to receive said tongues.

In Fig. 1 of the drawing, I have illustrated an elbow 15 as having a section of pipe 16 connected thereto. Assuming that there is a leak at the connection of the pipe 16 with the elbow 15, the application of my improved seal to the joint of said pipe and elbow is as follows:

Suitable packing is placed within the pocket 11 and the two sections of the sleeve 7 placed around the pipe 16 and joined together, by the tongues 12 and the grooves 14, whereby the sleeve will serve functionally as a solid sleeve. The sleeve is moved into engagement with the end of the elbow 15 and the two sections of the clamp placed together around the pipe 16 and the threads of the sleeve. The lugs 2 of the clamp sections are then bolted together by an ordinary bolt 17 and nut 18 until the clamp has become firmly fixed upon the section of pipe 16. The sleeve is then rotated in the threaded collar of the clamp until it firmly grips the end of the elbow 15 compressing the packing within the groove or pocket 11 and preventing further leakage of the connection.

In connection with the sleeve and clamp just described, gaskets 19 can be interposed between the sections of said sleeves or clamps, but I do not care to confine myself to the use of gaskets in this instance.

What I claim and desire to secure by Letters Patent, is:—

In a pipe seal, a sleeve embodying two half sections having interlocking tongues, and grooved in their meeting faces, one end of said sleeve being enlarged and the remainder thereof being exteriorly threaded, stepped shoulders formed in said enlarged head to respectively receive a packing and the end of an abutting pipe, and a clamp embodying two half sections fitting together and having an enlarged interiorly-threaded end to engage the threaded portion of the sleeve, and means for securing said clamp sections together.

In testimony whereof I affix my signature in the presence of two witnesses.

BERNARD FRANCES SHAUGHNESSY.

Witnesses:
K. H. BUTLER,
MAX H. SROLOVITZ.